United States Patent Office 3,499,074
Patented Mar. 3, 1970

3,499,074
METHOD OF MAKING AMYLOSTIC FILAMENTS AND FIBERS
John W. Barger, Kansas City, Mo., and Charles E. Mumma, Prairie Village, Kans., assignors to Department of Agriculture and Economic Development of Nebraska
No Drawing. Filed Sept. 7, 1966, Ser. No. 577,590
Int. Cl. D01f 9/00
U.S. Cl. 264—204                                    9 Claims

ABSTRACT OF THE DISCLOSURE

Amylosic filaments and fibers are made by forming a mixture of amylosic solids and up to 50% by weight of water, converting the mixture at elevated temperatures and pressures into a homogenous plastic mass, extruding the mass at a temperature not over about 205° F. through an orifice to form a filament and heating the filament at a temperature above 212° F. until sufficient moisture has been eliminated to render the filament non-adherent to itself.

---

This invention relates to amylosic filaments and fibers. More specifically, the invention provides a method of making amylosic filaments and fibers having unique physical properties which may be used to advantage in various applications.

There are certain products and methods in which the use of a tough, flexible, water-soluble and nontoxic fiber is especially advantageous. For example, in medical sutures and bandages such fibers will allow all or a portion of the sutures or bandages to be gradually absorbed by the tissue surfaces by dissolution or biodegradation of the fiber. Another specialized application for such a fiber involves filtering solids out of non-water soluble or miscible liquids with a filter woven from the fibers and thereafter dissolving the filter by washing with water whereby access to the filter is not necessary. Still another application for fibers having the described characteristics involves the formation of continuous channels through water permeable bodies by placing continuous fibers in the body, and thereafter leaching and dissolving the fibers with water to leave continuous channels corresponding to the original positions of the fibers.

We have now discovered a method of producing amylosic filaments and fibers having desirable characteristics of strength, flexibility and water solubility as mentioned above. Furthermore, the fibers of our invention are not toxic and can be digested by humans and other living systems, and thus satisfy the requirements for use in specialized applications such as the medical sutures or bandages mentioned earlier. In our method, we first form a physical mixture of amylosic solids and controlled amounts of water, and then we subject this mixture to elevated temperature and pressure to convert it into an homogeneous jelly-like plastic mass. We have found that this plastic mass can be successfully extruded into monofilaments by passing the mass through an orifice at a controlled temperature not exceeding about 205° F. and then immediately heating the extruded monofilament to higher temperatures to eliminate sufficient moisture to render the surfaces of the monofilament non-adherent to each other. Since the plastic mass contains relatively high proportions of water, it is necessary to extrude the monofilament at the controlled temperature mentioned above to prevent flash evaporation of water which will otherwise disrupt and degrade the structure of the monofilament. However, the monofilament when first extruded is extremely tacky and will adhere to itself or to other freshly extruded monofilaments if they are brought into contact with each other.

It was surprising and unexpected to find that the tacky and adhesive property of the freshly extruded monofilament can be eliminated by immediately heating the monofilament to temperatures far above the boiling point of water without disrupting or otherwise degrading the structure of the monofilament as might be expected. Thus, in our process, there is some form of critical relationship between extruding amylosic monofilaments at a temperature not exceeding about 205° F. and immediately thereafter heating the freshly extruded monofilament at much higher temperatures of at least about 300° and preferably from about 325° to about 600° F. In such a process, there is no question that moisture is eliminated by evaporation during the heat treatment of the freshly extruded monofilament. Yet, for reasons which we cannot explain at this time, there is no disruption or degradation of the structure of the monofilament from this release of moisture. We believe that control of the extrusion temperature to a maximum of about 205° F. in some way gives to the monofilament a stabilized physical configuration based on an orientation of its polymeric chains which results in an inherent capability to release moisture by evaporation without disruption of its physical configuration when subjected to the subsequent heat treatment. However, this represents only our best thinking at the present time based on the facts at hand and, while other explanations may later be proven, there is no question that it is a critical and essential requirement in our process that the amylosic monofilament be extruded at a controlled temperature not exceeding about 205° F. and then immediately heat treated at temperatures of at least about 300° F. to render the surfaces of the filament non-adherent to each other. By observing these conditions, it is possible to produce monofilaments on a continuous and practical basis for use in commercial operations.

In forming the essential mixture of amylosic solids and water, various types of amylose solid materials may be employed. As is known, most native starches consist of two basic polymers, one being a linear type polymer which is called amylose and the other a branched chain polymer called amylopectin. In our process, pure amylose may be employed as the filament-forming solid as well as derivatives of amylose such as ethers, esters, and anhydrides, exemplified by hydroxyethyl amylose and hydroxypropyl amylose. In addition, commercially available forms of high amylose starch, containing about 70% by weight and more of amylose (and the balance essentially amylopectin) can be used. Also, all of the foregoing materials may be used separately or in mixture with each other or with other materials. However, in all cases it is necessary that at least 50% of the total weight of the filament-forming solids be made up of pure amylose or an amylose derivative as defined above. Accordingly, as used in this specification and the appended claims, the term "amylosic solids" is defined to mean any mixture of filament-forming solids which includes at least about 50% by weight of pure amylose or an amylose derivative such as an amylose ether, ester or anhydride.

It is necessary to mix the amylosic solids with controlled proportions of water which generally may be from about 20% to about 50% based on the total weight of the mixture. This amount of water is insufficient to dissolve the amylosic solids so that at ambient temperatures and pressure, the mixture has the form of separate particles of the amylosic solids which are unset and uncaked.

As an optional additional ingredient in the mixture of amylosic solids and water, various plasticizers may be included in minor amounts up to about 10% based on the total weight of the mixture. Suitable plasticizers are organic compounds having one or a plurality of alcoholic hydroxyl groups and are exemplified by glycerine and other polyhydric alcohols. Further examples of plasticizers which may be used are invert sugars, corn syrup, d-sorbitol, ethylene glycol, di-ethylene glycol, hydroxypropyl glycerine and similar hydroxyalkyl ethers of polyhydric alcohols. The plasticizers serve as an extrusion aid and also give a beneficial effect upon the flexibility of the final filament. However, the plasticizer is not an essential ingredient in forming the initial mixture of amylosic solids and water.

The physical mixture of particulate amylosic solids and water is subjected to elevated temperature and pressure to convert it into an homogeneous plastic mass. Generally speaking, the temperatures used in this treatment may be from about 240° to about 360° F. and preferably from about 290° to about 310° F. While subjected to these temperatures, the mixture is confined under super atmospheric pressure which may be anywhere up to 2000 p.s.i. or greater. At these temperatures and pressures, the mixture changes from particulate solids into a viscous jelly-like plastic mass which is flowable. The mechanisms by which this conversion is achieved are not well understood but it appears that it involves a combination of factors such as dissolution of the amylosic solids and melting thereof.

After the mixture has been converted into the homogeneous plastic mass, it is extruded through an orifice to form a monofilament of the plastic mass. In carrying out such an extrusion we have employed orifices of a diameter ranging from 0.002 to 0.004 inch, eight of such orifices being spaced in a single extrusion die. However, other sizes of orifice may be used depending upon the thickness desired for the monofilament.

As previously mentioned, it is critical and essential to carry out the extrusion of the plastic mass at a controlled temperature not exceeding about 205° F. If such temperature is exceeded, the monofilament will be disrupted or degraded from flash evaporation of water as it is emitted from the die. Also, the temperature must be at least about 170° F. since it is virtually impossible to form uniform filaments at any lower temperature. Thus, the overall range of temperature during extrusion may be from about 170° F. to about 205° F., which means that cooling is necessary from the higher temperatures of the hot plastic mass. In cooling down the plastic mass as it is extruded, the extrusion die must be provided with a water jacket or core so that the composition becomes cooled simultaneously as it is extruded. Alternatively, the plastic mass must be cooled just before extrusion into the monofilament by means of cooling jackets or other cooling devices located in advance of the extrusion die.

After the monofilament is emitted from the extrusion orifice, it is necessary and essential to heat the monofilament at elevated temperatures of at least about 300° F. and preferably from about 325° to about 600° F. This heat treatment eliminates moisture from the monofilament and thereby renders the surfaces of the monofilament non-adherent to each other. As previously mentioned, it is surprising and unexpected that such a heat treatment can be applied to the freshly extruded monofilament without disrupting the physical structure of the filament. The heat treatment is continued until the surface portions of the filament are non-adherent and this will usually be accomplished in less than one minute depending upon the temperature employed. Naturally at the higher temperatures of heat treatment, the time required will be shorter and the point at which the filament surfaces become non-adherent can be readily determined by physical inspection. For optimum storage characteristics, it is desirable to reduce the moisture content of the filament to within the range 7–15% by weight.

The monofilament may be collected as such or a plurality of filaments may be gathered together into a strand or fiber. In either case it is preferable to stretch the filament and/or fiber since this increases the flexibility and strength. The filament or fiber may be stretched up to about five times its original length when first extruded and there are indications that stretching may be carried out up to about ten times the original length. It is believed that during the stretching the molecules of the amylosic solids become oriented and by this orientation the flexibility and tensile strength is increased.

Further details of the invention are illustrated by the following examples which represent preferred embodiments. All proportions given are by weight unless otherwise indicated.

EXAMPLE 1

An hydroxypropyl derivative of a high amylose starch originally having about 70 percent amylose content and 30 percent amylopectin content was mixed with 4 percent glycerine and 26 percent water, and this mixture was then used to form amylosic monofilaments.

To carry out extrusion, a standard one-inch diameter screw extruder equipped with a standard metering pump and fiber spinneret die was employed. The screws of this extruder gave a compression gain of 3 to 1 or 1.5 to 1 and were revolvable at 10 to 100 r.p.m. The metering pump, which prevents surging at the spinneret die, was a Zenith (size ½, 1 or 5) pump having a discharge capacity rating of 0.297 to 2.92 cc./revolution and operable at speeds of about 20 to 80 r.p.m. The spinneret die had eight equally spaced holes of 0.002 to 0.004 inch diameter on a ⅞ inch diameter circle and was provided with electric heating elements and a hollow core for water cooling.

The above-described mixture was dispensed into the extruder from a hopper and, while confined under super atmospheric pressure, heated therein in two successive stages, first at a temperature of about 150° F. and then at a temperature ranging from about 290° to about 310° F. As a result, the mixture was converted into a homogeneous plastic mass which was extruded through the spinneret die holes and simultaneously cooled to a temperature ranging from about 175° to 190° F. by means of water circulating through the spinneret core.

The eight monofilaments of amylosic solids continuously emerging from the spinneret die were passed through a cylindrical chamber equipped with infrared lamps and thereby subjected to air temperatures of about 315° F. After about eight feet of travel through this chamber, the surfaces of the monofilament became non-adherent to each other as compared to the tacky, sticky surfaces of the freshly-extruded filaments, and the heat-treated filaments were next gathered into an untwisted yarn by means of a conventional revolving take-up winder and wound upon a cardboard spool. This winder was revolved at such speeds as to cause stretching of the filaments to about five times their original length as emitted from the spinneret die.

The denier number, tensile strength, elastic modulus and elongation of the monofilaments produced above were determined as follows:

Average denier number _____ 102
Tensile strength:
    Maximum _____grams/denier__ 0.27
    Average _____do____ 0.24
Elastic modulus (initial):
    Maximum _____do____ 18.9
    Average _____do____ 15.9
Elongation:
    Maximum _____percent__ 2.8
    Average _____do____ 2.3

EXAMPLE 2

Fibers were produced using the same modified high amylose starch derivative as in Example 1, but this time mixed only with water in the proportions of 70 percent of the derivative and 30 percent water.

This mixture was extruded into fibers in the manner previously described using a spinneret with 0.004-inch diameter holes and was stretched by a factor of 1 to 5.

Results of physical property tests on these fibers were as follows:

| | |
|---|---|
| Average denier number | 89 |
| Range of denier numbers | 71 to 113 |
| Tensile strength: | |
| Maximum _____grams/denier__ | 0.30 |
| Average _____do____ | 0.25 |
| Elastic modulus (initial): | |
| Maximum _____do____ | 21.6 |
| Average _____do____ | 18.4 |
| Elongation: | |
| Maximum _____percent__ | 2.8 |
| Average _____do____ | 2.1 |

EXAMPLE 3

Fibers were formed using the same modified high amylose starch derivative as in Example 1 in a mixture containing 65 percent of the derivative and 35 percent water.

This mixture was extruded into fibers as previously described using a spinneret with 0.0004-inch diameter holes. The stretch factor was 1 to 5.

Physical property tests on these fibers gave the following results:

| | |
|---|---|
| Average denier number | 69 |
| Range of denier numbers | 57 to 85 |
| Tensile strength: | |
| Maximum _____grams/denier__ | 0.37 |
| Average _____do____ | 0.29 |
| Elastic modulus (initial): | |
| Maximum _____do____ | 23.0 |
| Average _____do____ | 18.4 |
| Elongation: | |
| Maximum _____percent__ | 5.4 |
| Average _____do____ | 3.8 |

All data presented above as to tensile strength, modulus, and elongation were obtained on an Instron Testing Machine (Model TT-CM) using 2.5-in. test specimen lengths of monofilament and standard A.S.T.M. procedures.

It will be understood that it is intended to cover all changes and modifications of the preferred embodiments of the invention, herein chosen for the purpose of illustration, which do not constitute departures from the spirit and scope of the invention.

We claim:

1. A process of producing amylosic starch filaments which comprises the steps of forming a mixture of amylosic solids and up to about 50% of water based on the weight of the mixture, subjecting said mixture to elevated temperature and pressure to convert the same into a homogenous plastic mass, cooling the mass and then passing said mass at a temperature not exceeding about 205° F. through at least one orifice to form a continuous filament thereof and then immediately heating said filament by passing it into a drying atmosphere held at a temperature of at least 300° F. until sufficient moisture has been eliminated to render the surface of said filament substantially non-adherent.

2. A process as in claim 1 wherein up to about 10% of a plasticizer having at least one alcoholic hydroxy group is included in said mixture based on the weight thereof.

3. A process as in claim 1 wherein said elevated temperature is within the range from about 240° to about 360° F.

4. A process as in claim 1 wherein said elevated pressure is up to about 2000 p.s.i.

5. A process as in claim 1 wherein said filament is heated at temperatures from about 300° to about 600° F.

6. A process as in claim 1 which includes the step of stretching said filament up to about five times its original length as emitted from said orifice.

7. A process as in claim 1 which includes the steps of producing a plurality of said filaments and gathering said plurality into an untwisted yarn.

8. A process as in claim 1 wherein said water is included in amounts ranging from about 20% to about 50% based on the weight of said mixture.

9. A process as in claim 1 wherein said plastic mass is passed through said orifice at a temperature within the range from about 170° to 205° F.

References Cited

UNITED STATES PATENTS

| | | | |
|---|---|---|---|
| 2,515,393 | 7/1950 | Burke. | |
| 2,608,723 | 9/1952 | Wolfe et al. | |
| 2,822,581 | 2/1958 | Muetgees et al. | 264—217 |
| 2,570,449 | 10/1951 | Horsak | 264—186 |
| 2,973,243 | 2/1961 | Kudera | 264—186 |
| 3,137,592 | 6/1964 | Protzman et al. | |
| 3,222,220 | 12/1965 | Wurzburg et al. | 106—213 X |
| 3,243,308 | 10/1963 | Barge et al. | 264—176 X |

JULIUS FROME, Primary Examiner

J. H. WOO, Assistant Examiner

U.S. Cl. X.R.

264—217, 234